United States Patent

[11] 3,591,288

| [72] | Inventors | Roy W. Aday, Jr.<br>La Habra;<br>Maoyeh Lu, Fullerton, both of, Calif. |
| --- | --- | --- |
| [21] | Appl. No. | 836,064 |
| [22] | Filed | June 24, 1969 |
| [45] | Patented | July 6, 1971 |
| [73] | Assignee | Beckman Instruments, Inc. |

[54] TORQUE-ISOLATING MOUNTING STRUCTURE
2 Claims, 3 Drawing Figs.
[52] U.S. Cl. ..................................... 356/74,
248/187, 248/159, 356/97
[51] Int. Cl. ..................................... G01j 3/02,
F16m 11/00
[50] Field of Search ..................................... 356/74-
—101; 248/466, 469, 11, 158, 159, 176,
178—180, 187, 358

[56] References Cited
UNITED STATES PATENTS
2,873,936  2/1959  Baur ............................. 248/180
OTHER REFERENCES
Keuffel: JOURNAL OF THE OPTICAL SOCIETY OF AMERICA AND REVIEW OF SCIENTIFIC INSTRUMENTS, volume 11, No. 4, October 1925, pages 403— 410
McNicholas: "Research Paper RP 704," Part of JOURNAL OF RESEARCH OF THE NATIONAL BUREAU OF STANDARDS, vol. 13, August 1934, pages 211 and 223— 231 relied on.

*Primary Examiner*—Ronald L. Wibert
*Assistant Examiner*—F. L. Evans
*Attorneys*—Paul R. Harder and Robert J. Steinmeyer ABSTRACT: There is disclosed a torque-isolating mounting structure consisting of a pedestal joining member interconnecting and supporting a kinematic optical assembly upon a base member.

PATENTED JUL 6 1971  3,591,288

INVENTORS
ROY WILLIAM ADAY, JR.
MAOYEH LU

BY
ATTORNEY

TORQUE-ISOLATING MOUNTING STRUCTURE

This invention relates to mounting structures and in particular a torque-isolating mounting structure to connect a precision optical assembly to a base member whereby twisting or bending forces as may occur on the base member are isolated from the precision optical assembly.

In spectrophotometric apparatus, precision optical mounting has been the object of substantial research and development effort. The spectrophotometer requires the generation of an adjustable narrow band of electromagnetic energy centered at a variable wavelength. The generation of this spectrally variable band of energy is accomplished by a monochromator containing a spectrum-dispersing device and a spectrum-selecting device. The monochromator is a part of the spectrophotometer apparatus and mechanically attached to the spectrophotometer base.

The problem encountered in mounting the monochromator to the spectrophotometer base is the coupling to the monochromator of twisting and bending forces that may be inadvertently applied to the spectrophotometer base during its use and application. These forces create relative mechanical movement of the dispersive elements and the spectrum-selecting elements in the monochromator resulting in uncalibrated spectrum shifts in the monochromator output and changes in the bandwidth of energy at the particular wavelength. Therefore, the measurements being performed by the spectrophotometer will be in error.

If the spectrum shifts from a calibrated point, a particular sample in the sample path of the spectrophotometer may yield more or less absorption of energy than in fact occurs at the calibrated point. In addition bandwidth variation similarly affect the absorption reading to produce erroneous results.

To overcome the problem of spectrum and bandwidth shifting caused by external stresses acting upon the spectrophotometer base, several methods of monochromator mounting have been utilized in the prior art. One approach has been to provide a mounting base for the spectrophotometer of such bulk and massive size that its inherent strength prevents any bending or twisting that could be transmitted to the monochromator. This approach results in an instrument that is unreasonably heavy, difficult and costly to move and transport and expensive to fabricate.

Another approach has been to use a thick plate mounted perpendicular to the base of the spectrophotometer and to which the monochromator is attached. The twisting forces from the base are thereby limited to the plane of the plate having the greatest strength and twist resistance. Although the plate mounting provides an instrument with less bulk and weight than the first approach described hereinabove, the method is still undesirable for the same reasons of weight and cost.

It is the principal object of this invention to provide a supporting mounting structure for attaching a precision optical assembly to a base member whereby the mounting structure isolates from the precision optical assembly any twisting or bending forces and stresses as may be present upon the base member.

Another object is to provide a spectrophotometer wherein the monochromator portion thereof is supported on the spectrophotometer base by a mounting structure whereby the monochromator is isolated from the external bending and twisting forces to which the spectrophotometer base may be subjected.

Other features and objects of the present invention will be better understood from a consideration of the following detailed description when read in conjunction with the attached drawing wherein like parts are identified by like numbers and in which.

Figure 1:
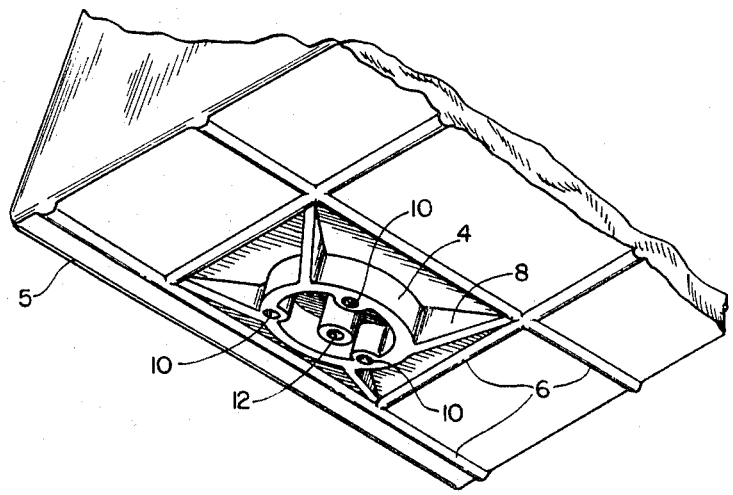
FIG. 1 illustrates a portion of a pictorial view of a monochromator mounting structure constructed in accordance with the teachings of the present invention.

Referring now to FIG. 1, a portion of a pictorial view of the bottom of a monochromator casting enclosure 5 is illustrated. The precision optical assembly associated with the monochromator function (not shown) is mounted into and on the enclosure 5. A protruding mounting pedestal in the form of mounting collar 4 is integrally cast as a part of the enclosure 5 and centrally located on a surface thereof. The holes 10 are provided through the collar to the inside of the enclosure for the insertion of mounting bolts. A raised portion 12 in the center of the collar 4 is provided with an alignment hole to align the monochromator casting enclosure when placed upon the spectrophotometer base. Extra strength is provided for the casting and collar by ribs 6 and supporting angles 8 integrally cast into the enclosure 5.

Figure 2:
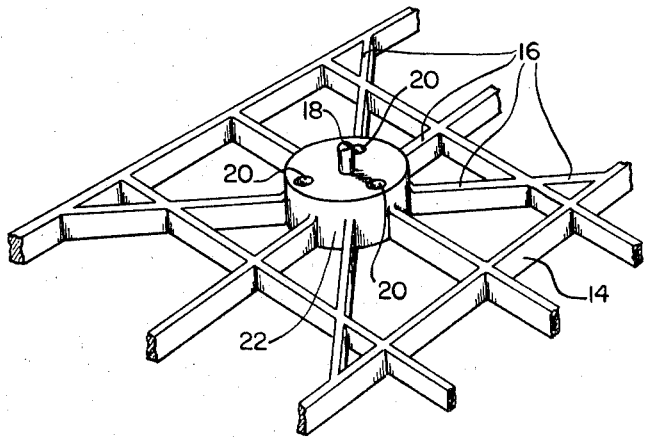
FIG. 2 illustrates a portion of a pictorial view of a spectrophotometer base structure constructed in accordance with the present invention to receive the monochromator mounting structure displayed in FIG. 1.

FIG. 2 illustrates a section of the weblike spectrophotometer optical base assembly 14. The webs 16 provide structural support and strength for the mounting pedestal 22. Into mounting pedestal 22 are placed threaded holes 20 for receiving the mounting bolts from the monochromator casting. Pin 18 is for alignment and mates with the alignment hole provided in the monochromator casting.

Figure 3:
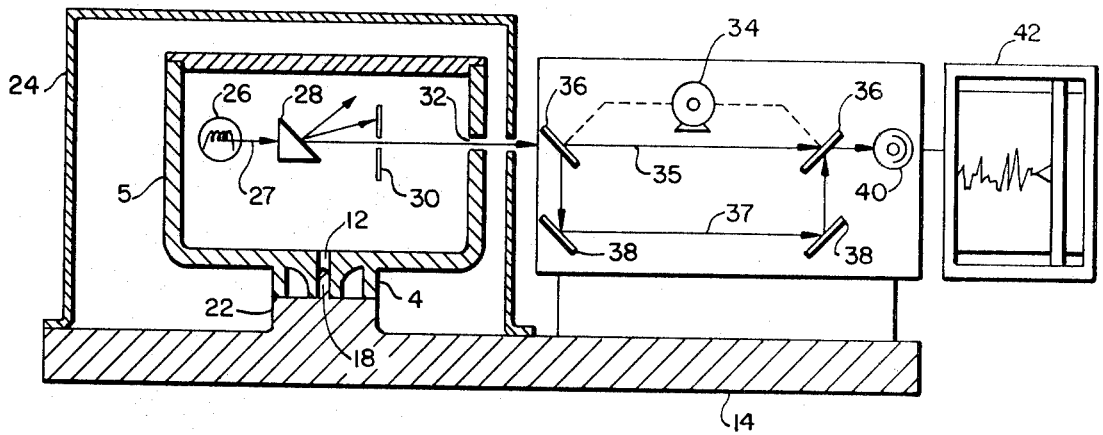
FIG. 3 illustrates a general spectrophotometer assembly with contained symbolic functions and incorporating the monochromator and spectrophotometer base mounting structures as taught by the present invention.

Referring now to FIG. 3, spectrophotometer base 14 with mounting pedestal 22 is illustrated connected to monochromator casting enclosure 5 through mounting pedestal 4. A cross-sectional view shows alignment pin 18 mating with alignment hole 12. Symbolically shown within the enclosure 5 are the functional components of the monochromator consisting of a source of illumination 26, a spectrum-dispersing device 28 and a spectrum-selecting or exit slit 30. The monochromatic energy exits from the monochromator through opening 32 and a cooperating opening in the covering enclosure 24. The energy is then intercepted by rotating segmented mirrors 36 which alternately switch the energy between reference path 35 and sample path 37. A motor 34 drives the segmented mirrors 36 in synchronism. The resulting alternately switched energy is directed to detector 40 where the radiant energy is converted to an electrical signal. The electrical signal is further processed (not illustrated) and displayed by recorder 42.

Although a particular monochromator is illustrated in FIG. 3, the present invention is not limited thereto. It is apparent that source 26 is not a critical element and may be mounted external to the enclosure 5, having illumination therefrom enter through another opening or entrance slit (not illustrated) similar to 32. In addition, dispersing device 28 may be comprised of more than one dispersing element as well as spectrum-selecting slit 30 may be comprised of more than one selecting element such as may be found in multiple monochromator instruments. The drawing is symbolic where relevant to the monochromator and spectrophotometer elements and it is apparent that the present invention is applicable to other monochromator and spectrophotometer configurations where isolation of forces as taught by the present invention is useful.

The operation of the mounting structure will now be described in greater detail by referring to FIGS. 1 and 2. The mounting collar 4 is of small diameter in proportion to the size of the monochromator enclosure casting 5 and is centrally located on a surface of casting 5. When the enclosure 5 is placed upon the base 14 with alignment pin 18 mating with alignment hole 12 and mounting bolts are placed through holes 10 to engage and tighten into the threaded holes 20, the monochromator is mounted to the spectrophotometer base in accordance with the teachings of this invention. When the base 14 is subjected to external stresses or twisting forces very little torque can be transmitted through pedestal 22 to collar 4 due to the small diameter of the collar 4 and of the mounting pedestal 22 and the rigid structure of these mounting pedestals. As a result, even if base 14 undergoes significant twisting and bending due to forces applied at its extremities, little torque will be transmitted through the pedestal 22 into the collar 4. By isolating the twisting and bending forces from the monochromator in this manner, the monochromator elements are prevented from moving and thereby causing spectrum shift and energy band changes.

Referring now to FIG. 3, in determining the spectral output of the monochromator it is essential that the dispersive element 28 and the exit slit 30 are precisely maintained in calibrated positions relative to each other. Any motion of these elements results in a change in the energy bandwidth and the wavelength of the emitted radiation from the monochromator. It is the property and the characteristic of the small diameter mounting pedestal 22 and collar 4 to eliminate any significant bending or twisting forces that appear on base 14 from being transmitted to the monochromator casting enclosure 5 thereby keeping the critical monochromator elements 28 and 30 in precise mechanical alignment.

It now should be apparent that the present invention provides a mechanical mounting structure for fastening a precision optical assembly onto a base member whereby all twisting and bending forces as may occur on the base member are isolated from the precision optical assembly. Although particular mechanical configurations and arrangements have been discussed in connection with the specific embodiment of the mounting structure constructed in accordance with the teachings of the present invention, other mechanical arrangements and configurations may be utilized. Furthermore, it will be understood that although an exemplary embodiment of the present invention has been disclosed and discussed, other applications and mechanical arrangements are possible and that the embodiment disclosed may be subjected to various changes, modifications and substitutions without necessarily departing from this invention.

What we claim is:

1. Supporting means approximating a single point-supporting structure for mounting a precision optical assembly onto a base member to provide torque isolation of said precision optical assembly from said base member, said supporting means comprising:

pedestal-mounting means centrally located on and rigidly attached to a surface of said precision optical assembly, said pedestal means having a rigid supporting surface of dimensions substantially less than the dimensions of said surface of said optical assembly to reduce the twisting and bending forces which may be transmitted through said pedestal-mounting means to said optical assembly; and pedestal-receiving means rigidly attached to said base member and having a rigid supporting surface of dimensions matching said pedestal mounting means supporting surface, said pedestal-receiving means mating with and receiving said pedestal-mounting means thereby rigidly joining said optical assembly to said base member.

2. A torque-isolating mounting structure for connecting a monochromator to the base of a spectrophotometer and isolating from said monochromator stresses from external forces applied to the base of said spectrophotometer, said mounting structure comprising:

a rigid monochromator enclosure having a rigid integral mounting pedestal and circular supporting collar centrally located on a surface thereof, said collar having a diameter substantially less than said monochromator enclosure surface to minimize the twisting and bending forces which may be transmitted therethrough; and a rigid spectrophotometer base having a rigid and integral mounting pedestal and having a rigid supporting surface of dimensions matching said collar dimensions, said base mounting pedestal mating with and fastening to said mounting pedestal and supporting collar of said monochromator enclosure.